(12) United States Patent
Watanabe

(10) Patent No.: US 9,735,400 B2
(45) Date of Patent: Aug. 15, 2017

(54) BATTERY PACK LOCK STRUCTURE AND ELECTRONIC APPARATUS

(75) Inventor: Yoshitaka Watanabe, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 1111 days.

(21) Appl. No.: 13/881,988

(22) PCT Filed: Oct. 26, 2011

(86) PCT No.: PCT/JP2011/074733
§ 371 (c)(1),
(2), (4) Date: Apr. 26, 2013

(87) PCT Pub. No.: WO2012/057238
PCT Pub. Date: May 3, 2012

(65) Prior Publication Data
US 2013/0209866 A1    Aug. 15, 2013

(30) Foreign Application Priority Data

Oct. 29, 2010  (JP) ................................. 2010-243525

(51) Int. Cl.
*H01M 2/02*  (2006.01)
*H01M 2/04*  (2006.01)
(Continued)

(52) U.S. Cl.
CPC ........... *H01M 2/04* (2013.01); *H01M 2/1066* (2013.01); *H04M 1/0262* (2013.01); *H01M 2220/30* (2013.01)

(58) Field of Classification Search
CPC ........... H01M 2/02; H01M 2/04; H01M 2/10; H01M 2/1066
See application file for complete search history.

(56) References Cited

U.S. PATENT DOCUMENTS

2009/0239135 A1* 9/2009 Wang ................. H01M 2/1022
                                                                                429/100
2010/0291433 A1* 11/2010 Zuo ..................... H01M 2/1066
                                                                                429/175

FOREIGN PATENT DOCUMENTS

CN         1870665 A    11/2006
EP       0 836 311 A2    4/1998
(Continued)

OTHER PUBLICATIONS

Machine Translation of: Kiyono JP 2009/032595 A, Feb. 12, 2009.*
(Continued)

*Primary Examiner* — Kenneth Douyette
(74) *Attorney, Agent, or Firm* — Sughrue Mion, PLLC

(57) ABSTRACT

The present invention simplifies locking of a battery pack (12) within a cell-phone lower case (13). A battery lock member (50) has a first inclined surface that permits sliding of the battery lock member (50) in such a way that an operation of housing the battery pack (12) in the battery pack housing (33) causes an engagement protrusion (32), which is formed to protrude from a side face of the battery pack (12), to slide in contact with the first inclined surface, thereby releasing the locking, and a second inclined surface that permits sliding of the battery lock member (50) in such a way that an operation of attaching a battery lid (11) to a battery lid holder (43) causes a depression protrusion (31), which is formed to protrude from the bottom face of the battery lid (11), to slide in contact with the second inclined surface, thereby achieving the locking.

17 Claims, 18 Drawing Sheets

(51) Int. Cl.
*H01M 2/10* (2006.01)
*H04M 1/02* (2006.01)

(56) References Cited

FOREIGN PATENT DOCUMENTS

| EP | 1 411 565 A1 | 4/2004 |
| JP | 11-54099 A | 2/1999 |
| JP | 2001-176475 A | 6/2001 |
| JP | 2009-32595 A | 2/2009 |

OTHER PUBLICATIONS

Communication dated Nov. 21, 2014 from the State Intellectual Property Office of the People's Republic of China in counterpart application No. 201180051629.3.
Communication dated Dec. 5, 2016 from the European Patent Office in counterpart Application No. 11836371.2.

\* cited by examiner

BATTERY PACK LOCK STRUCTURE AND ELECTRONIC APPARATUS

CROSS REFERENCE TO RELATED APPLICATIONS

This application is a National Stage of International Application No. PCT/JP2011/074733, filed on Oct. 26, 2011, which claims priority from Japanese Patent Application No. 2010-243525, filed on Oct. 29, 2010, the contents of all of which are incorporated herein by reference in their entirety.

TECHNICAL FIELD

The present invention relates to a battery pack lock structure, and an electronic apparatus.

BACKGROUND ART

There are some electronic apparatuses, such as a cell phone, that adopt a configuration having a battery pack housing provided on an electronic apparatus body for housing a battery pack, and a battery lid which engages with the electronic apparatus body to close the battery pack housing (see, for example, Patent Literature 1).

In such a configuration, positioning of the battery pack to the electronic apparatus body is achieved only by the battery lid, the battery pack is loose within the battery pack housing so that there may be a situation where the electric connection between the electronic apparatus body and the battery pack is insufficient.

There may be a configuration, different from the foregoing configuration, in which a battery pack housing is provided with a battery lock member for locking a battery pack in a fixed position. This configuration permits the battery pack to be securely locked in a fixed position by the battery lock member.

PRIOR ART LITERATURE

Patent Literature

Patent Literature 1: Unexamined Japanese Patent Application Kokai Publication No. 2009-32595

DISCLOSURE OF THE INVENTION

Problems to be Solved by the Invention

According to such electronic apparatuses, however, with the battery lock member being in the locked state, housing and removable of the battery pack cannot be achieved unless the battery lock member is set in an unlocked state (free state). This makes it necessary to manually unlock the battery lock member. In this case, enforced housing of the battery pack may damage the battery pack or the electronic apparatus body.

Further, there is another problem such that when the battery pack housing is closed with the battery lid with the battery lock member left unlocked, the unlocked state is maintained so that the battery pack is not locked in the fixed position of the battery pack housing. That is, to securely lock the battery pack, the battery lock member should be manually set in a locked state.

The invention has been made in light of the foregoing situations, and it is an object of the invention to provide a battery pack lock structure that simply and securely locks a battery pack to an electronic apparatus body, and an electronic apparatus.

Means for Solving the Problems

To achieve the object, a battery pack lock structure according to a first aspect of the invention includes a battery pack housing provided on an electronic apparatus body for housing a battery pack;

a battery lid detachably attached to the electronic apparatus body to close an opening of the battery pack housing; and a battery lock member for locking the battery pack, the battery lock member having a first inclined surface that permits sliding of the battery lock member in such a way that an operation of housing the battery pack causes a first portion of the battery pack to slide in contact with the first inclined surface, thereby releasing the locking, and a second inclined surface that permits sliding of the battery lock member in such a way that an operation of attaching the battery lid causes a second portion of the battery lid to slide in contact with the second inclined surface, thereby achieving the locking.

An electronic apparatus according to a second aspect of the invention has the battery pack lock structure according to the first aspect of the invention.

Effects of the Invention

The invention can simply and securely lock a battery pack to an electronic apparatus body.

MODE FOR CARRYING OUT THE INVENTION

A cell phone according to an embodiment of the invention is described hereinbelow referring to the accompanying drawings.

Figure 1:
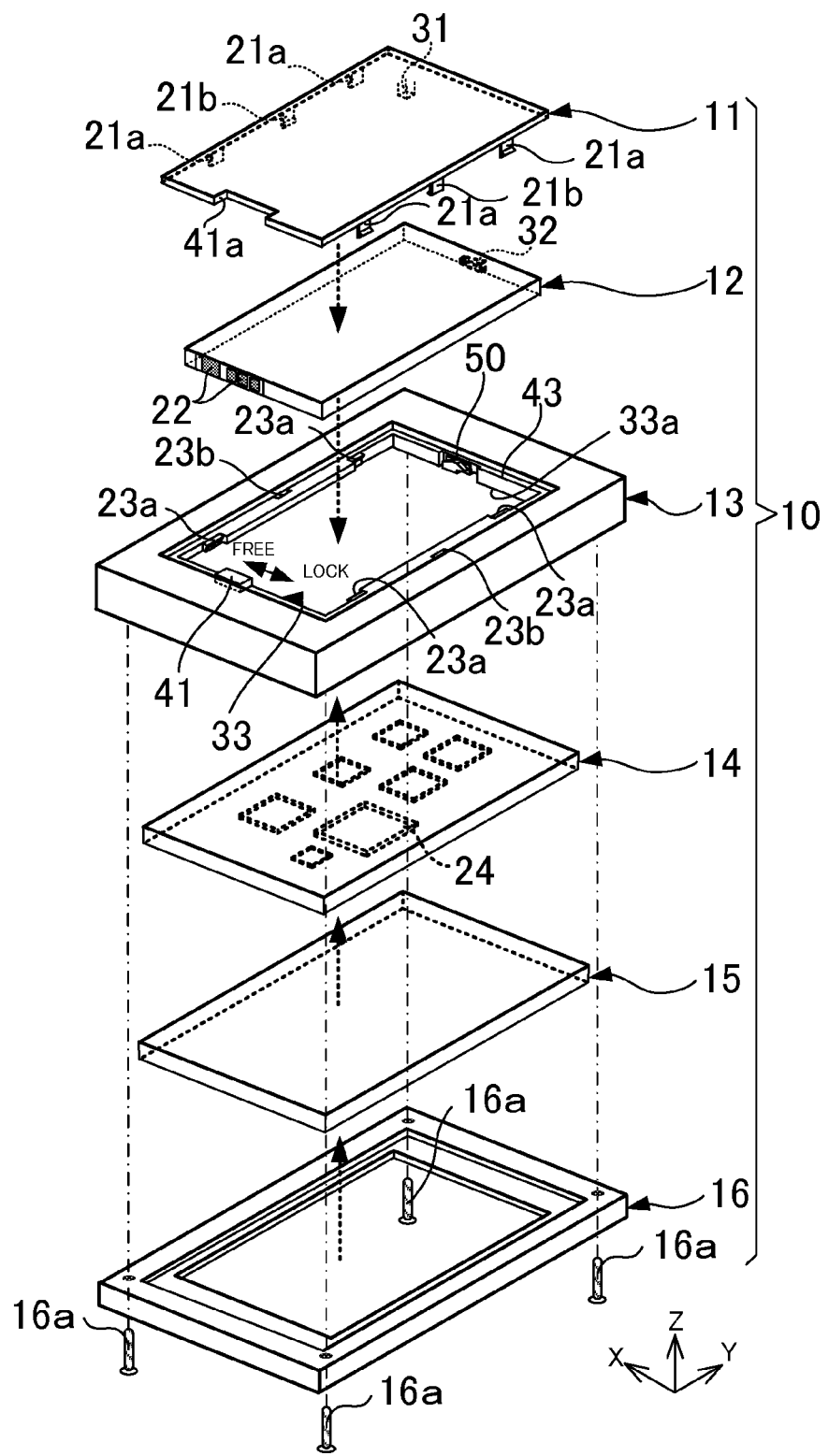
FIG. 1 is an exploded perspective view showing the general configuration of a cell phone according to an embodiment of the invention.

As shown in FIG. 1, a cell phone 10 according to the embodiment includes a battery lid 11, a battery pack 12, a cell-phone lower case 13, a board 14, a touch panel 15 equipped with an LCD (Liquid Crystal Display), and a cell-phone upper case 16. The cell phone 10 has a rectangular flat shape, each of the battery lid 11, the battery pack 12, the board 14 and the touch panel 15 has a rectangular flat shape similar to the shape of the cell phone 10, and both of the cell-phone lower case 13 and the cell-phone upper case 16 have rectangular frame shapes. The cell-phone lower case 13 and the cell-phone upper case 16 of the cell phone 10 form a box-shaped casing, and the structure excluding the battery pack 12 forms a cell-phone body.

The touch panel 15 includes the LCD, and an electronic touch sensor panel covering the LCD. The touch sensor panel detects a position where a capacitance is changed by a touch pen or a user's finger touching the position. The LCD displays an arbitrary image such as an icon for allowing the user to touch the touch panel 15 to input an operation instruction.

The touch panel 15 accepts an input made by touching of the touch pen or the like thereon. When there is an icon at the touched position, various functions assigned to this icon are achieved by a CPU (Central Processing Unit) 24 and a transmitter/receiver (not shown) and the like mounted on the board 14 of the cell phone 10.

The touch panel 15 is accommodated in the cell-phone upper case 16 with its touch sensor panel exposed on the surface. The touch panel 15 is accommodated, together with the board 14, in the housing space of the casing, formed by securing the cell-phone upper case 16 to the cell-phone lower case 13 with four bolts 16a, in such a state as to overlap the board 14.

A battery pack housing 33 having a rectangular opening 33a which penetrates the cell-phone lower case 13 in a thicknesswise direction is provided in the center portion of the cell-phone lower case 13 to house the battery pack 12. The battery pack 12 is housed in the battery pack housing 33 through the rectangular opening 33a of the battery pack housing 33 with the bottom side of the battery pack 12 being in contact with the bottom cover (not shown) of the board 14. Because the battery pack 12 is housed in the battery pack housing 33 in such a state, members that are present in the thicknesswise direction of the cell phone 10 are limited to the necessary components such as the battery pack 12, the board 14 and the touch panel 15, thereby contributing to flattening the cell phone 10.

A lock mechanism (not shown) that locks the battery lid 11 on a −Y side (front side) when being slid leftward/rightward, and an operation lever 41 for setting the lock mechanism in a locked state and a free state are provided on the cell-phone lower case 13 on the −Y side (front side) of a battery lid holder 43. The operation lever 41 moves leftward/rightward (to the free side/lock side) in a cutaway 41a provided on the −Y side (front side) of the battery lid 11. The lock mechanism is configured to be mechanically locked when the operation lever 41 is manually moved to the lock side (−X side), and be unlocked when the operation lever 41 is manually moved to the free side (+X side).

The battery lid holder 43 recessed in a rectangular frame shape from the top surface of the cell-phone lower case 13 is formed in the peripheral region of the rectangular opening of the battery pack housing 33 to hold the battery lid 11. A connection terminal 22 is provided on the −Y-side (front side) side face of the battery pack 12 to be connected to an unillustrated connection terminal provided on the cell phone body (cell-phone lower case 13).

As shown in FIG. 1, the cell phone 10 further includes a battery lock member 50 for fixing the +Y side (rear side) of the battery pack 12 to lock the battery pack 12 in a fixed position in the battery pack housing 33. An elongated pressing portion (not shown) for locking the front peripheral portion of the battery pack 12 from above is protrusively formed on the −Y side (front side) of the battery pack housing 33 in such a way as to extend a leftward/rightward direction. At the time of housing the battery pack 12 in the battery pack housing 33, the front peripheral portion of the battery pack 12 is slipped into the space under the pressing portion. This structure and the battery lock member 50 cause the battery pack 12 to be locked at the front and rear portions thereof, so that the battery pack 12 is stably housed in the battery pack housing 33.

Figure 2A:
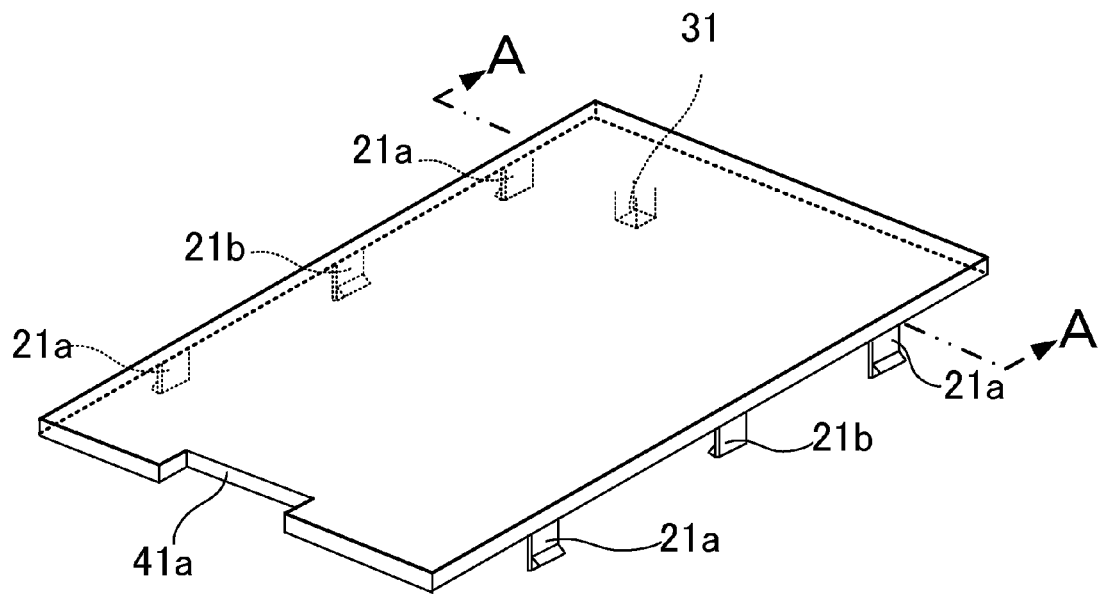
FIG. 2A is a perspective view of a battery lid.
Figure 2B:
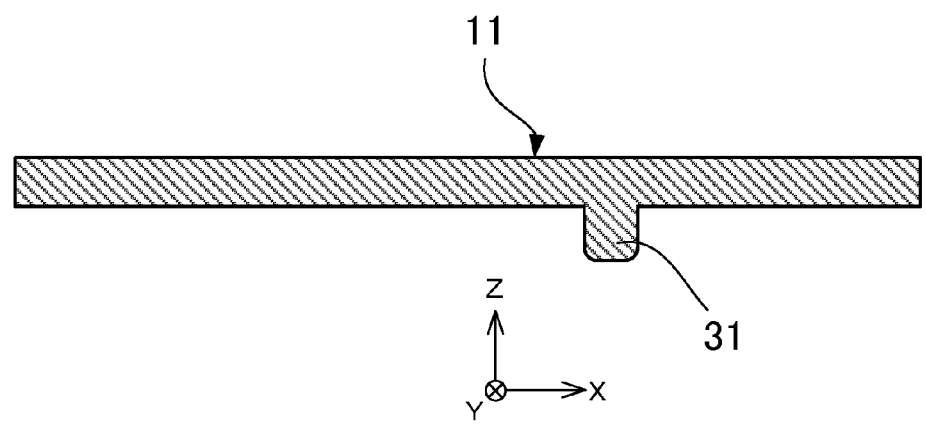
FIG. 2B is a cross-sectional view as seen from the arrows of line A-A in FIG. 2A.

As shown in FIGS. 1, 2A and 2B, two inward engagement claws 21a are protrusively formed at a predetermined interval therebetween in the vicinity of each of both ±X direction (leftward/rightward) sides of the battery lid 11 in a −Z direction (downward), and a single inward engagement claw 21b is protrusively formed between the two outward engagement claws 21a in the −Z direction (downward). The outward engagement claw 21a has an engagement protrusion protruding outward, and the inward engagement claw 21b has an engagement protrusion protruding inward.

As shown in FIG. 1, four engagement portions 23a with which the four outward engagement claws 21 of the battery lid 11 are engaged, and two engagement holes 23b with which the two inward engagement claws 21b of the battery lid 11 are engaged are formed at corresponding positions of the battery lid holder 43. When the battery lid 11 is attached to the battery lid holder 43, the battery lid 11 is held on the battery lid holder 43 and closes the opening of the battery pack housing 33 with the outward engagement claws 21a and the inward engagement claws 21b of the battery lid 11 being respectively engaged with the engagement portions 23a and the engagement holes 23b of the battery lid holder 43. This engagement structure permits the battery lid 11 to be stably held on the battery lid holder 43.

Figure 8:
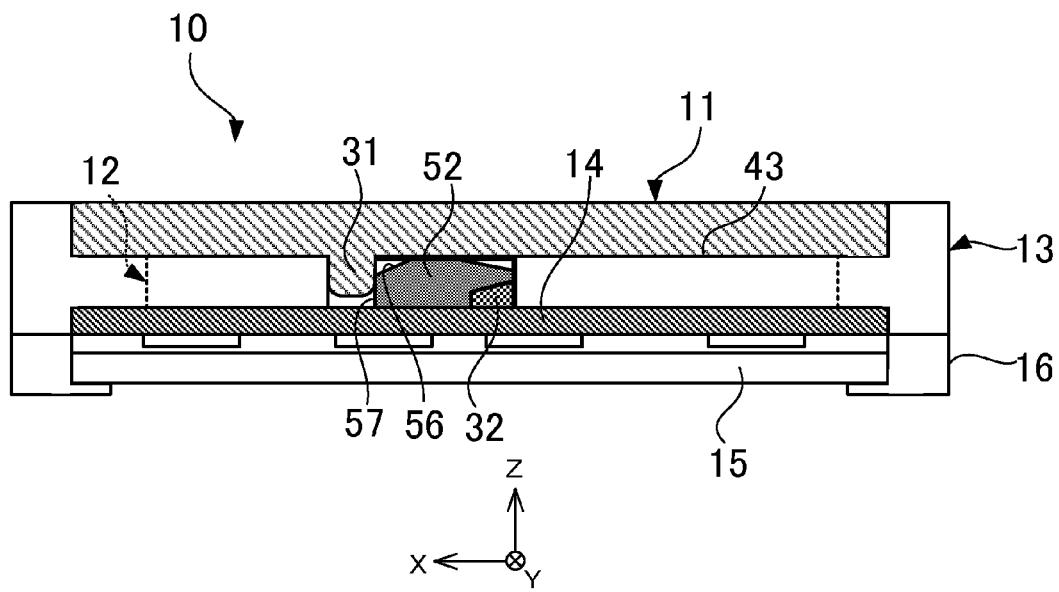
FIG. 8 is a cross-sectional view as seen from the arrows of line C-C in FIG. 7A.

Note that in the cell phone 10 according to the embodiment, when the battery lid 11 is attached to the battery lid holder 43, the bottom surface of the battery lid 11 substantially contacts the top surface of the battery pack 12 (see FIG. 8).

As shown in FIGS. 1, 2A and 2B, a depression protrusion 31 with a quadratic prism shape is protrusively formed in the −Z direction (downward) on the bottom side of the battery lid 11 in a predetermined position. The depression protrusion 31 of the battery lid 11 is disposed in a position where the depression protrusion 31 abuts on a second inclined surface 56 or a left side face 57 of a lock portion 52 of the battery lock member 50 to be described later with the battery lid 11 being held on the battery lid holder 43 (see FIGS. 4 and 8).

Figure 3A:
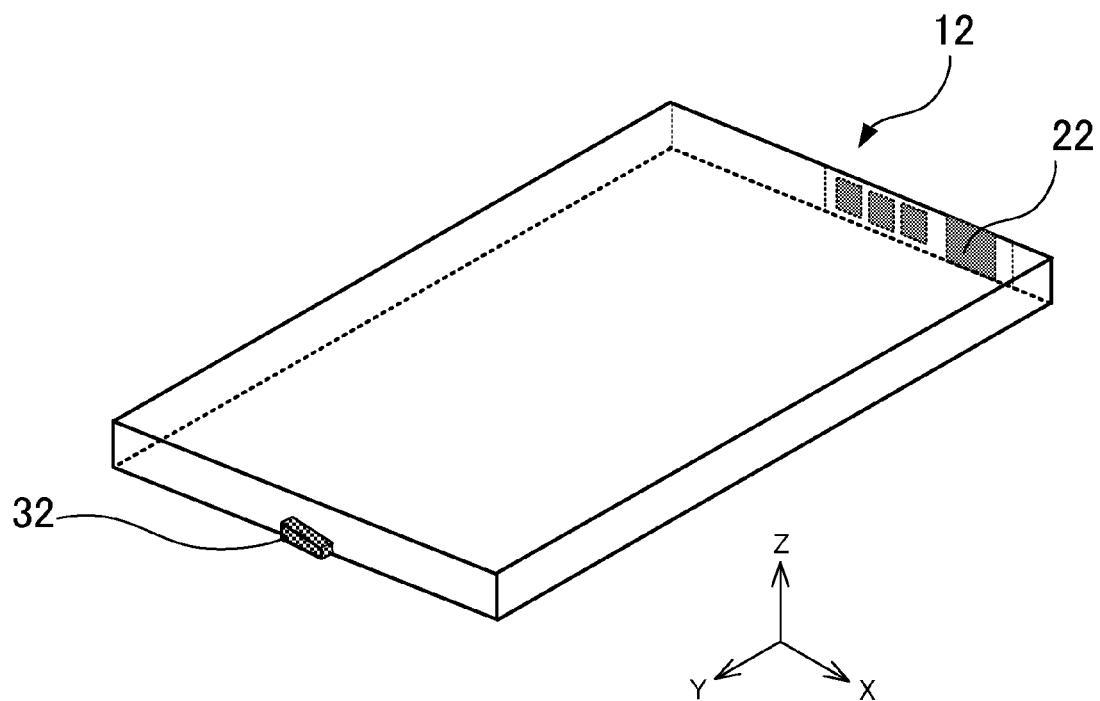
FIG. 3A is a perspective view of a battery pack.
Figure 3B:
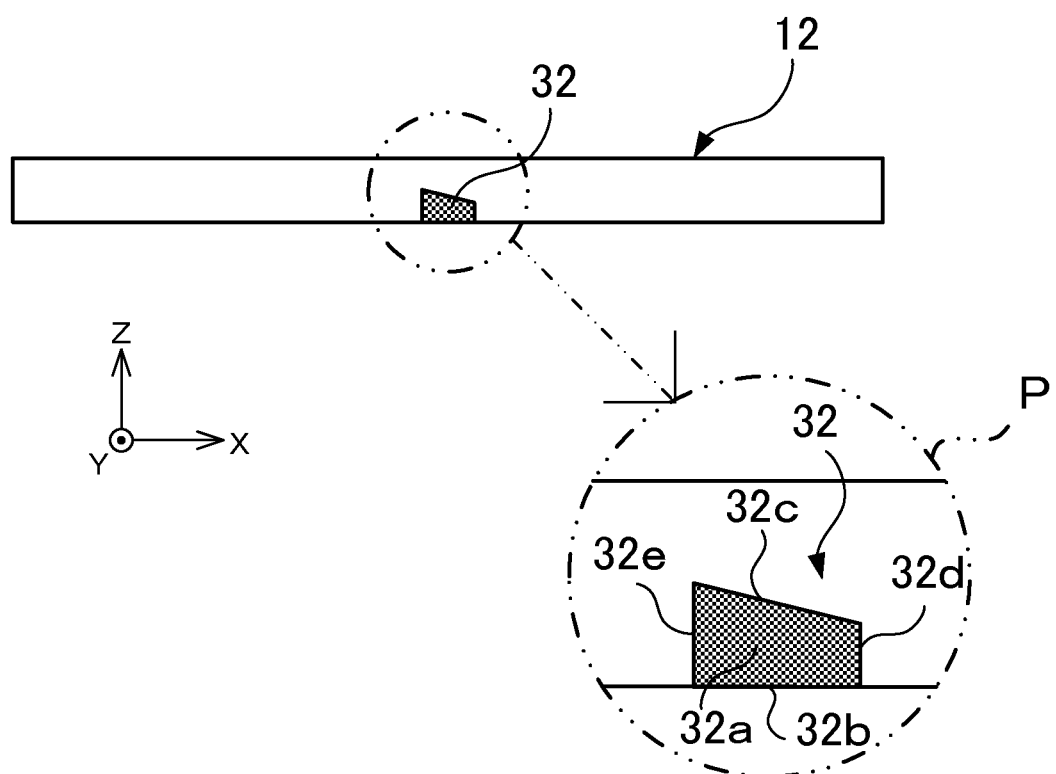
FIG. 3B is a side view of FIG. 3A as seen from frontward, with an encircled region P being an enlarged view of an engagement protrusion of the battery pack.

As shown in FIGS. 1, 3A and 3B, an engagement protrusion 32 with a trapezoidal cross section is protrusively formed at a center portion of the +Y-side (front side) side face of the battery pack 12.

As illustrated in enlargement in a region P in FIG. 3B, the engagement protrusion 32 has a front face 32a parallel to the frontward side face of the battery pack 12, a bottom face 32b flush with the bottom face of the battery pack 12, a back face 32c inclined with respect to the bottom face 32b so that the +X side (left side) becomes lower, and a pair of a first side face 32d and a second side face 32e connected to the front face 32a, the bottom face 32b and the back face 32c and opposing each other horizontally. The first side face 32d is lower than the second side face 32e.

As shown in FIGS. 4A to 4D, the battery lock member 50 includes a substantially rectangular cylindrical slide 51 having a guided groove 51a extending in the ±X direction (leftward/rightward) and opening to the +Z side (upper side) like a slit, and the lock portion 52 formed integral with the slide 51 and protruding from the −Y-side (front side) side face of the slide 51. A pair of projections 51b extending in the Z direction (upward/downward) and projecting inward are formed near the left and right end portions of the +Y-side side face of the guided groove 51a. A pressing protrusion 51c protruding inward is formed on an upper central portion of the −Y-side side face of the slit opening of the guided groove 51a.

Figure 4A:
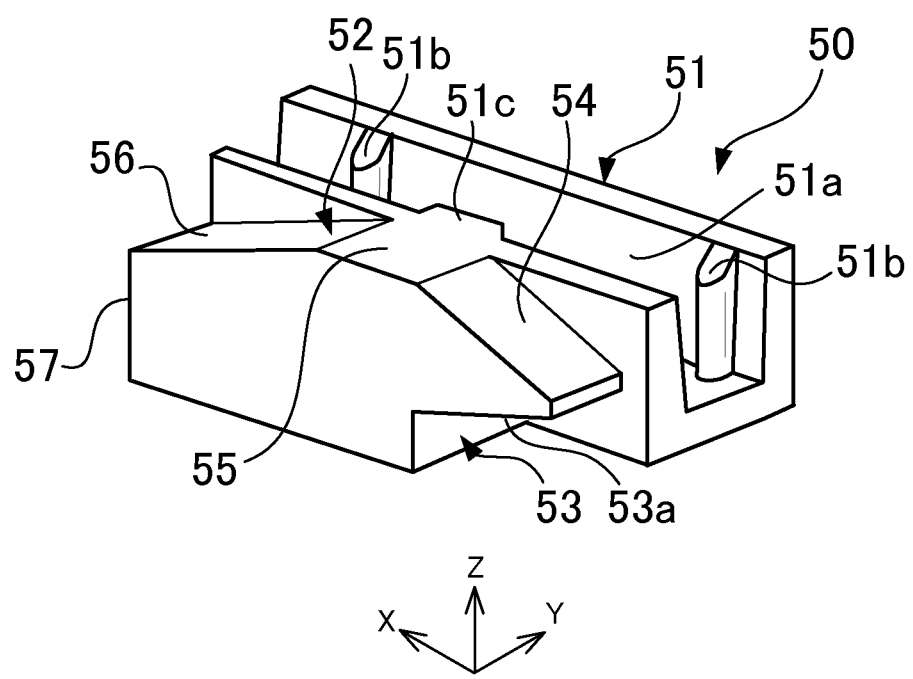
FIG. 4A is a perspective view showing the general configuration of a battery lock member.
Figure 4B:
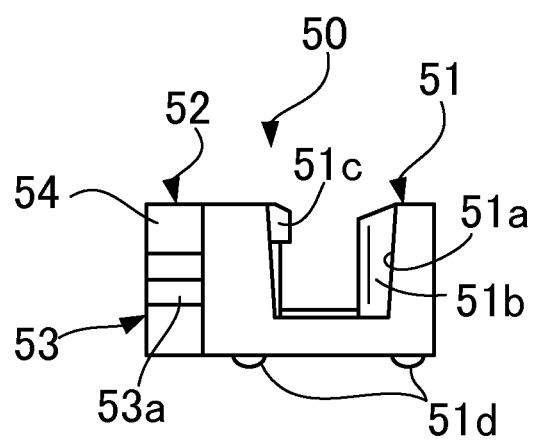
FIG. 4B is a front view of FIG. 4A as seen from rightward.
Figure 4B:
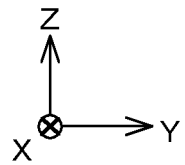
Figure 4C:
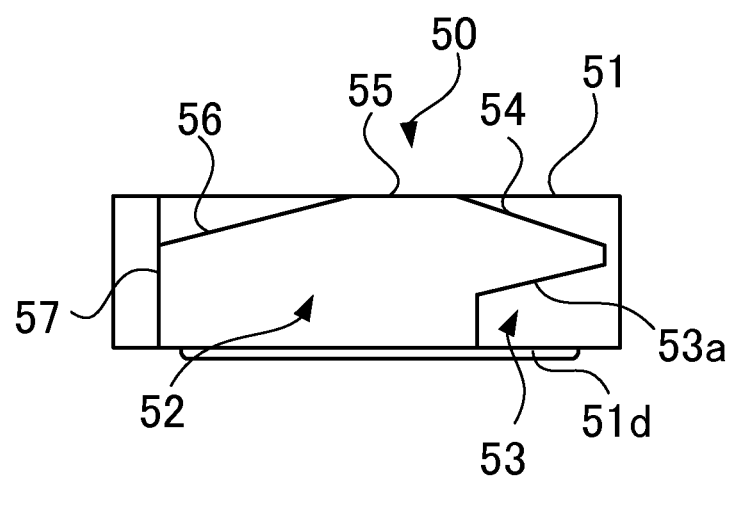
FIG. 4C is a side view of FIG. 4A as seen from frontward.
Figure 4C:
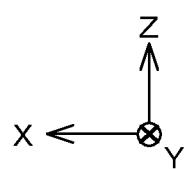
Figure 4D:
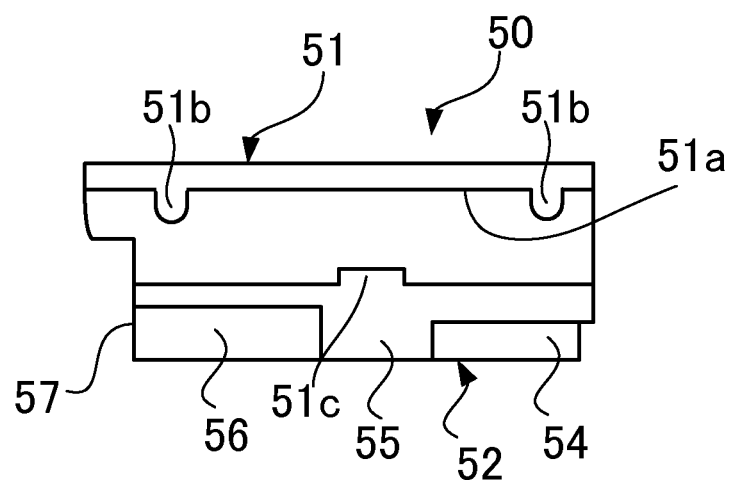
FIG. 4D is a side view of FIG. 4A as seen from above.
Figure 4D:
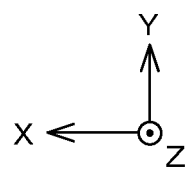
Figure 4E:
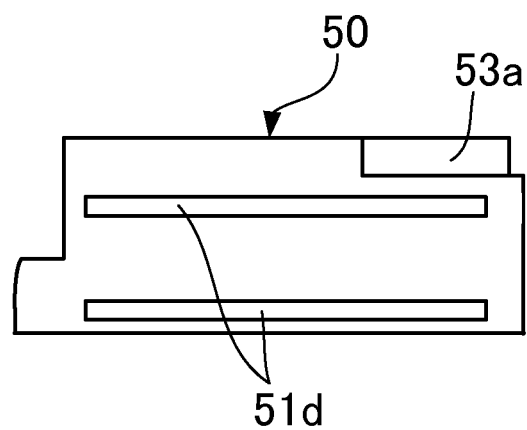
FIG. 4E is a side view of FIG. 4A as seen from below.
Figure 4E:
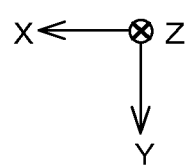

As shown in FIGS. 4B, 4C and 4E, a pair of elongated slide assisting ribs 51d extending in the X direction are formed on the bottom face of the battery lock member 50 to protrude downward therefrom. The slide assisting ribs 51d are provided to reduce the slide friction by changing slide region of the battery lock member 50 from a planar region to a linear region when it sides on the surface of the bottom cover of the board 14.

As shown in FIGS. 4A and 4C, an engagement recess 53 recessed in a trapezoidal cross section is formed in a right side portion of the lock portion 52 in such a way that when the battery pack 12 is housed in the battery pack housing 33 and locked, the engagement protrusion 32 of the battery pack 12 engages with the engagement recess 53.

Formed on the top face of the lock portion 52 are a first inclined surface 54 inclined so that the −X side (right side) becomes lower, an upper surface 55 continual to the first inclined surface 54 and substantially parallel to the top face of the slide 51, and the second inclined surface 56 continual to the upper surface 55 and inclined so that the +X side (left side) becomes lower. The top face of the engagement recess 53 of the lock portion 52 serves as a third inclined surface 53a that faces the back face 32c of the engagement protrusion 32 (see FIG. 3B) in parallel thereto when the engagement recess 53 engages with the engagement protrusion 32 of the battery pack 12. Further, the left side face 57 is formed at the lock portion 52 to be continual to the second inclined surface 56. In this way, the first inclined surface 54 and the second inclined surface 56 of the battery lock member 50 face each other so as to form a first angular portion therebetween along the moving direction (±X direction) of the battery lock member 50 (see FIG. 5), and the first inclined surface 54 and the third inclined surface 53a of the battery lock member 50 face each other so as to form a second angular portion therebetween along the moving direction of the battery lock member 50. The above structure permits the lock portion 52 of the battery lock member 50 to be formed compact.

Figure 5:
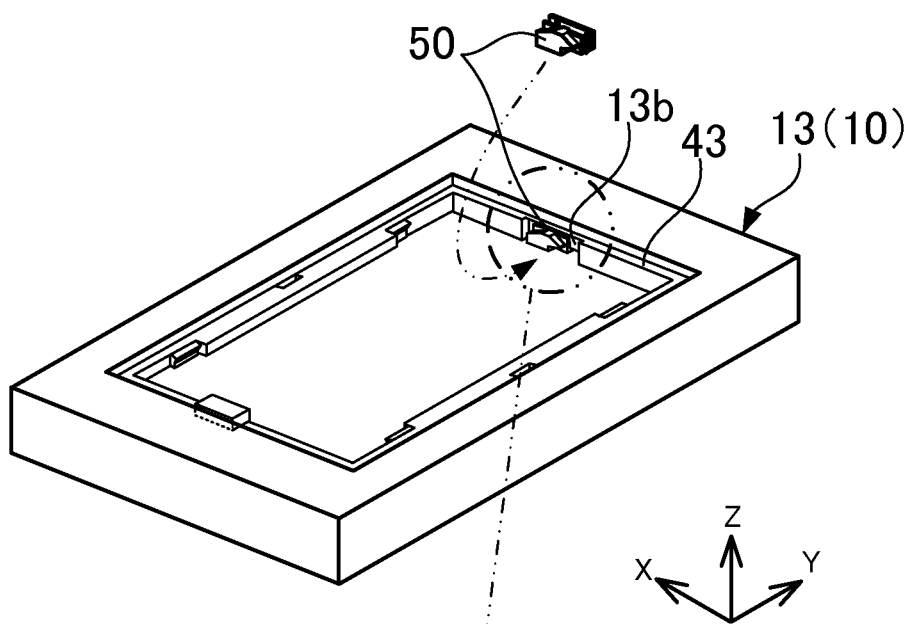
FIG. 5 is a perspective view showing a position and a structure of attaching the battery lock member to the cell phone, with an encircled region Q being an enlarged view of the battery lock member and a structure therearound.
Figure 5:
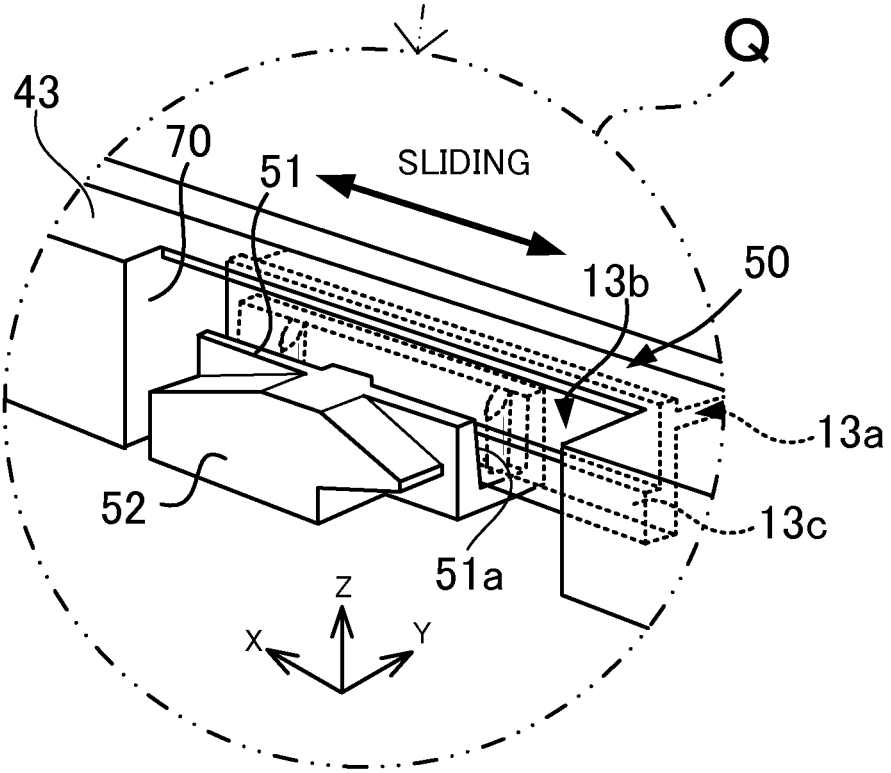

As illustrated in enlargement in a region Q in FIG. 5, a recessed space 70 is formed in the −Y side (rear side) of the battery lid holder 43. The battery lock member 50 is configured to be accommodated in the recessed space 70 and slide in the ±X direction along a guide rail 13b provided in the recessed space 70. The guide rail 13b is formed to protrude downward from a part 13a of the cell-phone lower case 13. Accordingly, the battery lock member 50 is reasonably accommodated in the cell phone body while saving the layout space for the battery lock member 50. Specifically, referring to FIG. 7B, the battery lock member 50 is configured in such a way that the guided groove 51a of the slide 51 is slidably fitted over the guide rail 13b and that a projection 13c formed at the lower portion of the guide rail 13b so as to extend in the leftward/rightward direction and protrude toward the −Y side is hooked on the pressing protrusion 51c of the guided groove 51a, thereby preventing the battery lock member 50 from coming off the guide rail 13b. In addition, contact of the pair of projections 51b of the guided groove 51a with the guide rail 13b in a linear region reduces the slide friction between the guide rail 13b and the guided groove 51a. The slide 51 of the battery lock member 50 is formed of a hard resin such as polyacetal, and the aforementioned structure prevents the battery lock member 50 from coming off the guide rail 13b. Further, this structure suppresses the force of causing the battery pack 11 at the time of drop impact of the cell phone 10.

Figure 6A:
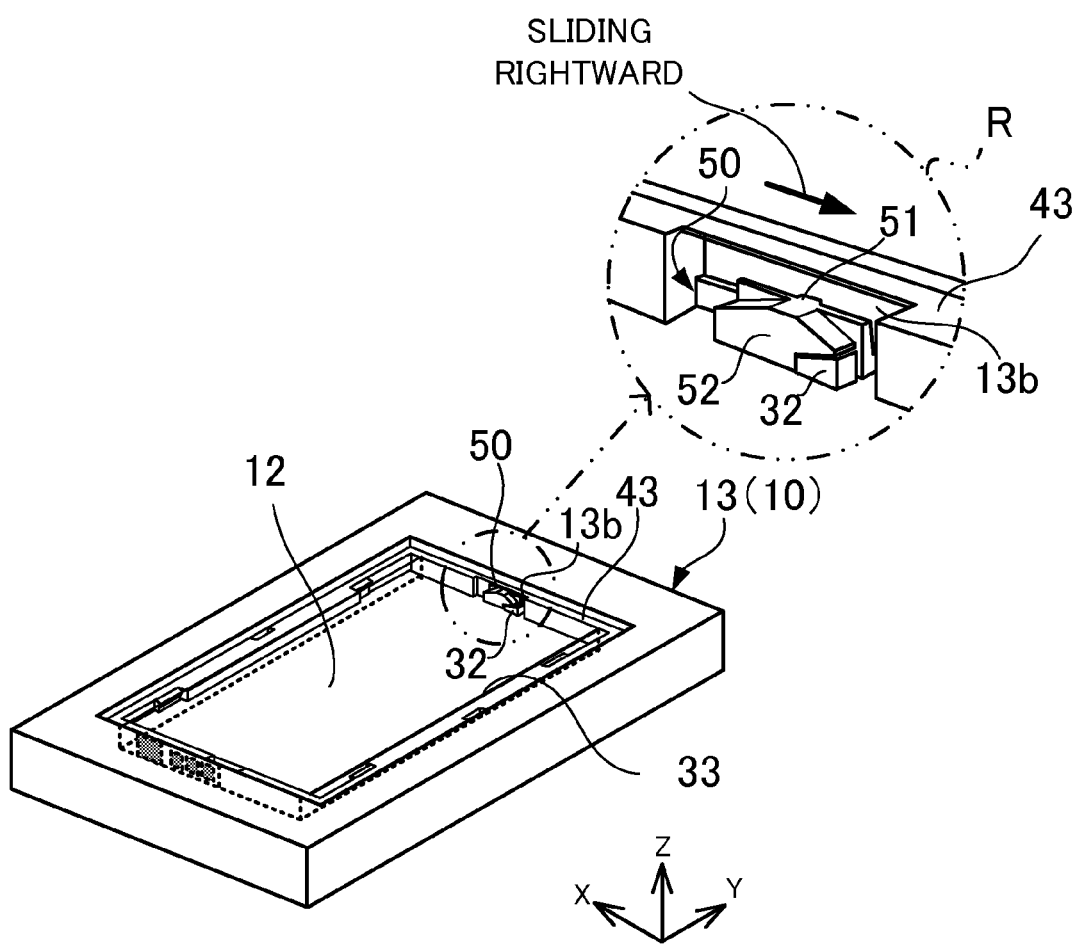
FIG. 6A is a perspective view showing a locked state in which the battery pack is locked by the battery lock member, with an encircled region R being an enlarged view of the battery lock member and the structure therearound.

As illustrated in enlargement in a region R in FIG. 6A, when the battery lock member 50 slides toward the −X side (rightward) along the guide rail 13b, the engagement recess 53 of the lock portion 52 engages with the engagement protrusion 32 of the battery pack 12. As a result, the battery pack 12 is locked in a fixed position in the battery pack housing 33.

Figure 6B:
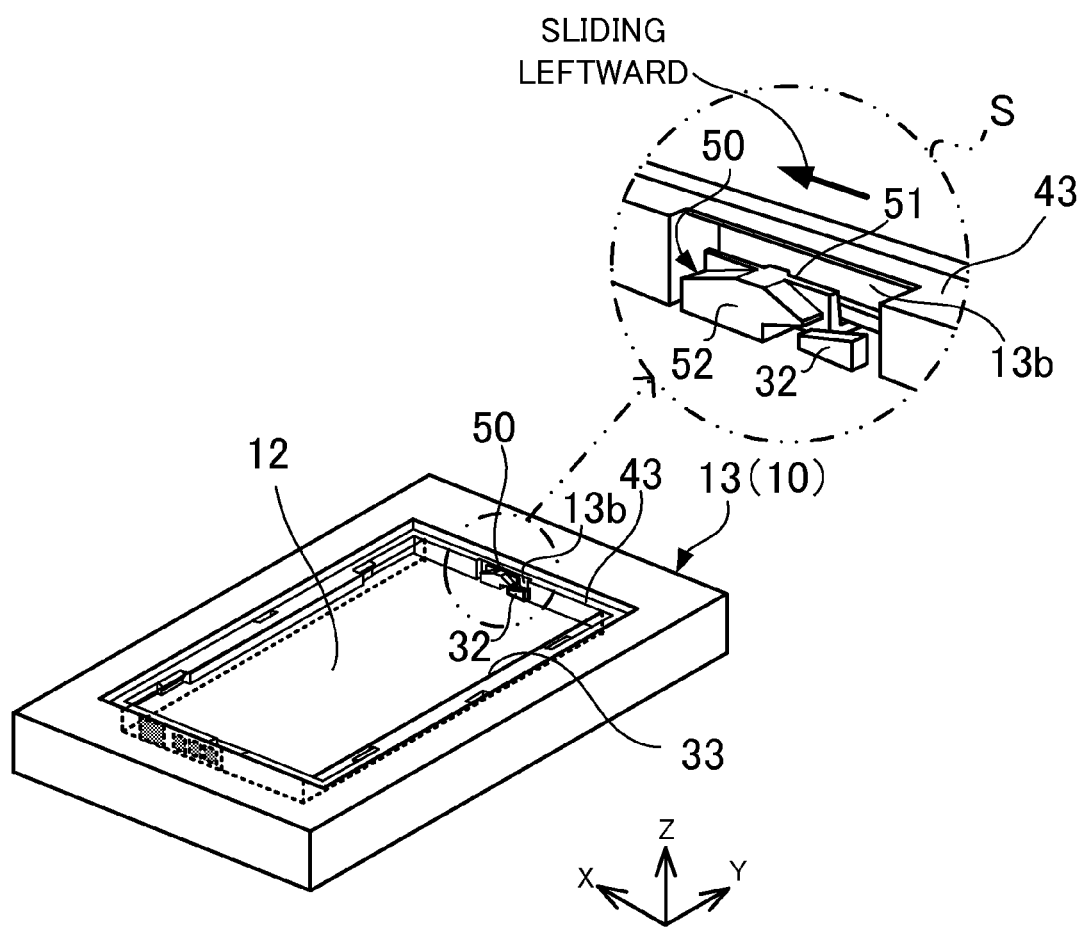
FIG. 6B is a perspective view showing an unlocked state in which the battery pack is not locked by the battery lock member, with an encircled region S being an enlarged view of the battery lock member and the structure therearound.

As illustrated in enlargement in a region S in FIG. 6B, on the other hand, when the battery lock member 50 slides toward the +X side (leftward) along the guide rail 13b, the engagement of the engagement recess 53 of the lock portion 52 with the engagement protrusion 32 of the battery pack 12 is released. In this state, the battery pack 12 can be removed from the battery pack housing 33.

Figure 7A:
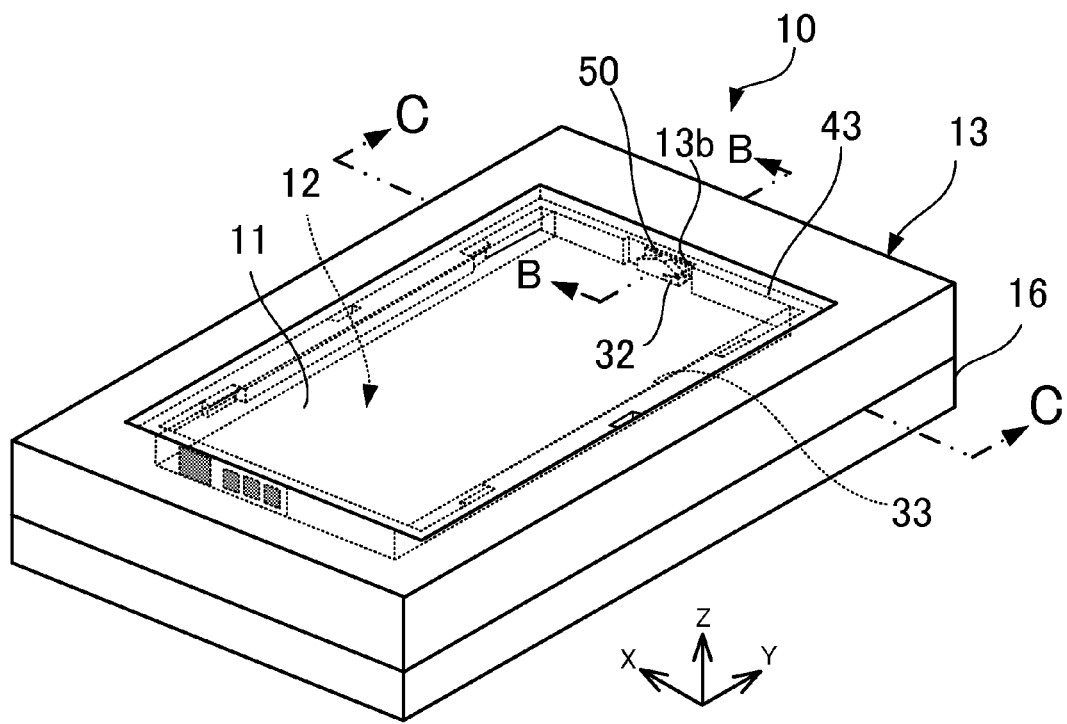
FIG. 7A is a perspective view of the cell phone.
Figure 7B:
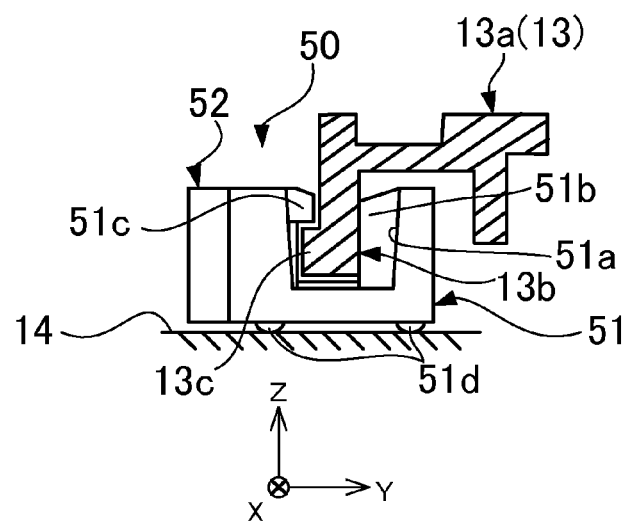
FIG. 7B is a diagram showing essential portions in a cross section as seen from the arrows of line B-B in FIG. 7A.

As shown in FIGS. 7A, 7B and 8, when the battery lid 11 is attached to the battery lid holder 43 with the battery pack 12 housed in the battery pack housing 33, the battery pack 12 is sealed inside the battery pack housing 33. In this state, the depression protrusion 31 of the battery lid 11 abuts on the left side face 57 of the lock portion 52 (see FIG. 8), and the battery lock member 50 engages with the engagement protrusion 32, thus locking the battery pack 12 in the fixed position in the battery pack housing 33. In this state, the connection terminal 22 provided on the battery pack 12 is electrically connected to the connection terminal (not shown) provided on the cell-phone lower case 13. Then, necessary drive power is supplied to the board 14 and the touch panel 15, setting the cell phone 10 in an operable state. As apparent from the above, abutment of the depression protrusion 31 of the battery lid 11 on the left side face 57 of the lock portion 52 of the battery lock member 50 stabilizes the locking of the battery pack 12 with the battery lock member 50.

The cell phone 10 according to the embodiment is configured as described above, and the following describes an operation of housing the battery pack 12 in the battery pack housing 33 of the cell phone body (cell-phone lower case 13) and sealing the battery pack 12 therein with the battery lid 11.

Figure 9A:
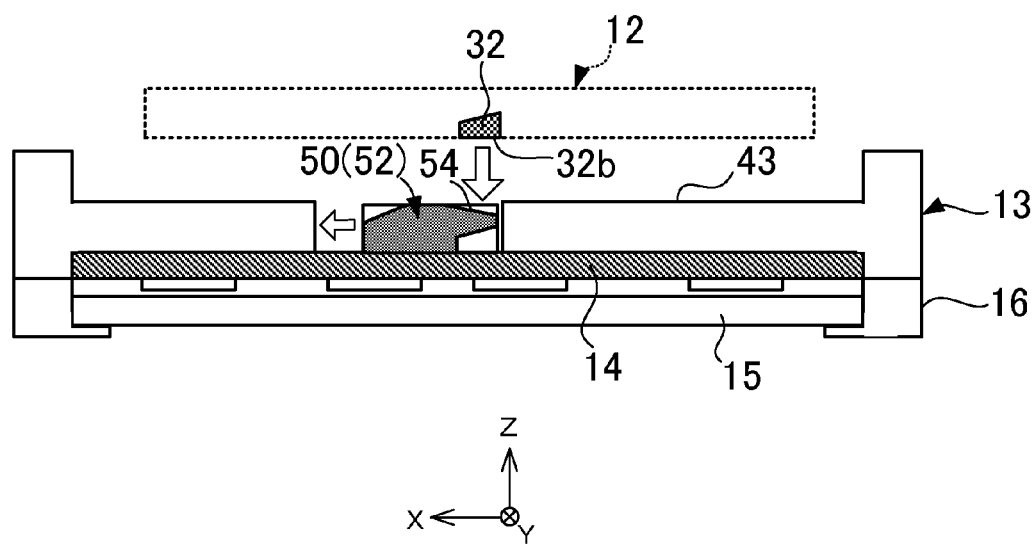
FIG. 9A is a cross-sectional view of the cell phone showing the battery pack housed in a battery pack housing with the battery lock member being in a locking position.

To begin with, as shown in FIG. 9A, when the battery pack 12 is housed into the battery pack housing 33 with the battery lock member 50 being located in the position of locking the battery pack 12, the bottom face 32b of the engagement protrusion 32 of the battery pack 12 (see FIG. 3B) slides in contact with the first inclined surface 54 of the lock portion 52 of the battery lock member 50 (see FIG. 4A).

Figure 9B:
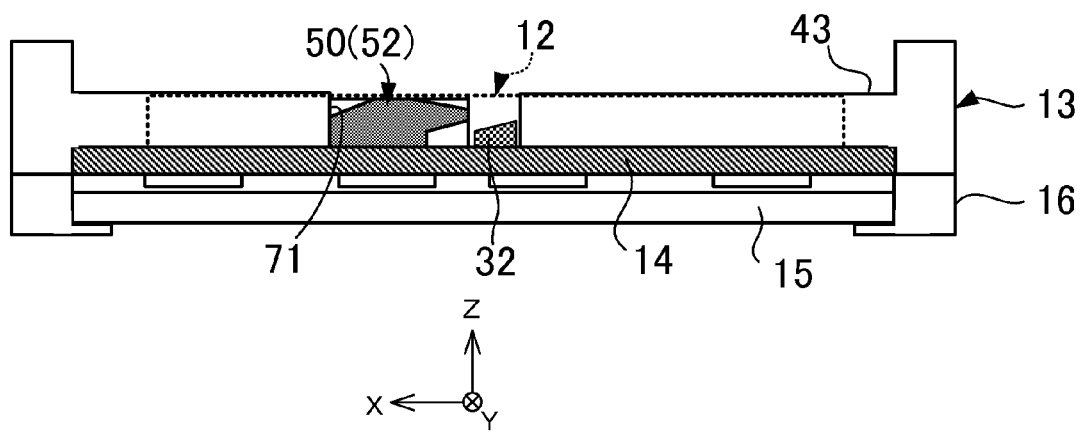
FIG. 9B is a cross-sectional view showing the battery pack housed in a battery pack housing with the battery lock member being in an unlocking position.

Then, the downward movement of the engagement protrusion 32 presses the battery lock member 50 (lock portion 52) in the +X side direction (leftward), so that the battery lock member 50 slides toward the side of unlocking the battery pack 12 (toward a left side face 71 of the recessed space 70) as shown in FIG. 9B. At this time, the battery lock member 50 slides on the surface of the bottom cover of the board 14 via the pair of slide assisting ribs 51d. Then, the battery pack 12 is housed in the battery pack housing 33.

Figure 9C:
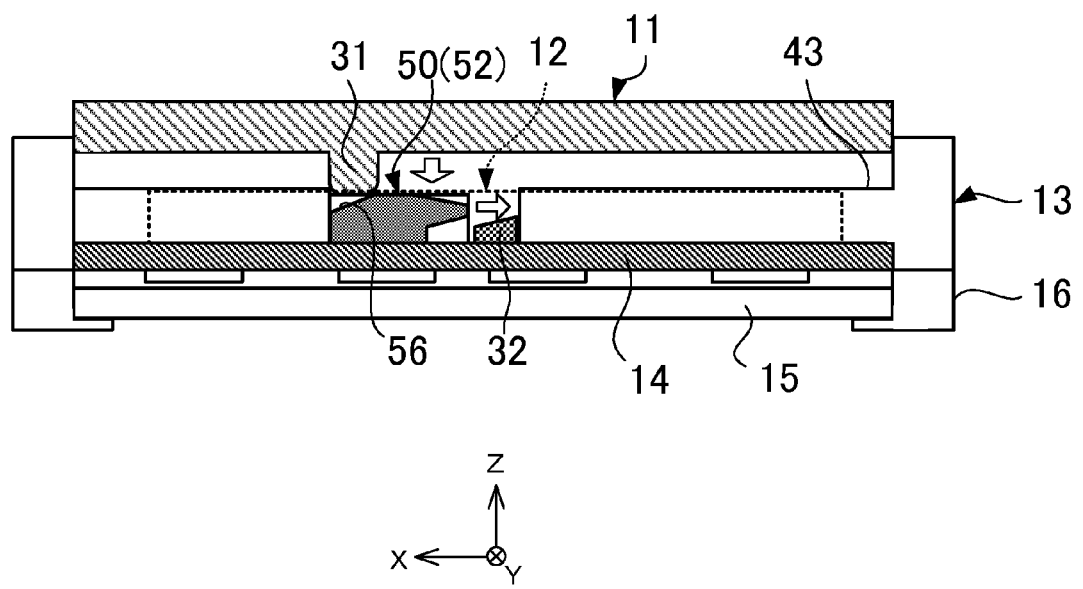
FIG. 9C is a cross-sectional view showing the battery lid attached to a battery lid holder with the battery lock member being in an unlocked state.

Further, when the battery lid 11 is attached to the battery lid holder 43 with the battery lock member 50 being in the unlocked state shown in FIG. 9B, as shown in FIG. 9C, the depression protrusion 31 of the battery lid 11 slides in contact with the second inclined surface 56 of the lock portion 52 of the battery lock member 50. Then, the downward movement of the depression protrusion 31 of the battery lid 11 presses the battery lock member 50 in the −X side direction (rightward), so that the battery lock member 50 slides so as to lock the battery pack 12.

Figure 9D:
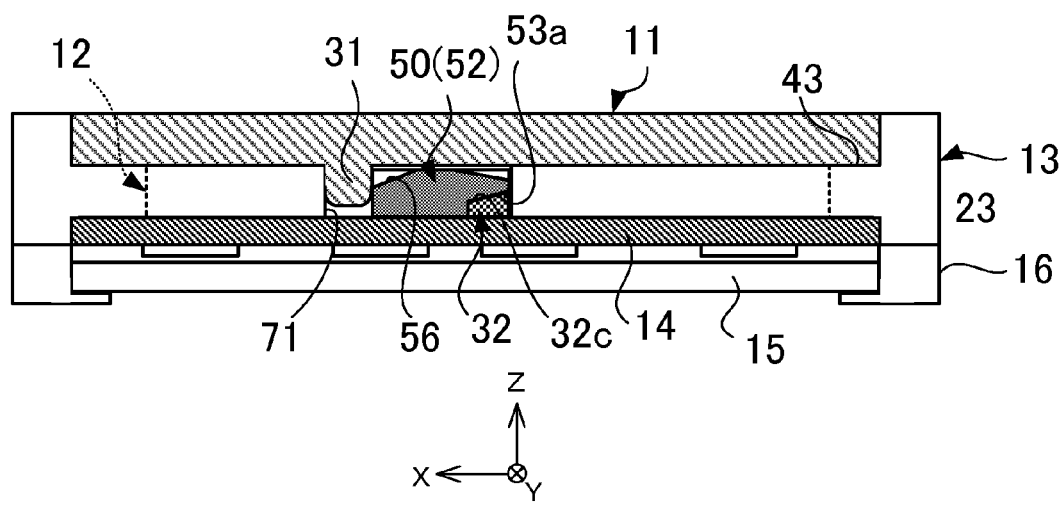
FIG. 9D is a cross-sectional view showing the battery pack sealed in the battery pack housing with the battery lid.

Then, as shown in FIG. 9D, the engagement recess 53 of the lock portion 52 engages with the engagement protrusion 32 of the battery pack 12, causing the battery pack 12 to be locked in the battery pack housing 33 with the battery lock member 50 (see FIG. 6A). In this state, the third inclined surface 53a of the engagement recess 53 of the lock portion 52 and the back face 32c of the engagement protrusion 32 of the battery pack 12 faces each other in parallel. The depression protrusion 31 of the battery lid 11 is accommodated in the space formed between the left side face 57 of the lock portion 52 of the battery lock member 50 and the left side face 71 of the recessed space 70. In this state, the depression protrusion 31 of the battery lid 11 abuts on the left side face 57 of the lock portion 52 of the battery lock member 50, so that the locked state becomes stable. After completion of the attachment of the battery lid 11, the battery lid 11 is held on the battery lid holder 43 with the outward engagement claws 21a and the inward engagement claws 21b of the battery lid 11 (see FIG. 2A) being engaged with the engagement portions 23a and the engagement holes 23b of the battery lid holder 43. Thereafter, the operation lever 41 is manipulated to the lock side to lock the battery lid 11 to the cell-phone lower case 13.

The following describes an operation of detaching the battery lid 11 from the cell-phone lower case 13 (battery lid holder 43) of the cell phone 10 according to the embodiment, and further removing the battery pack 12 from the battery pack housing 33.

Figure 10A:
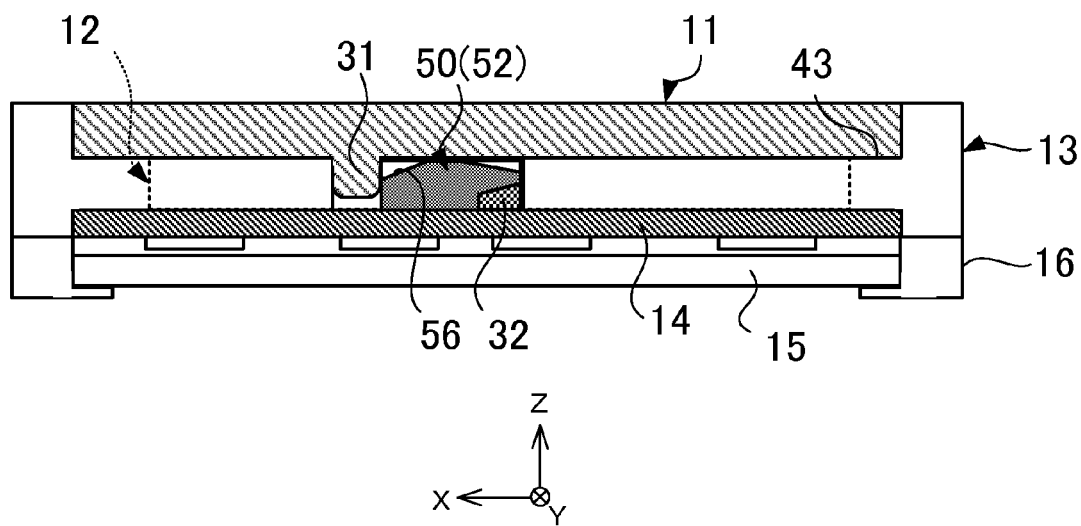
FIG. 10A is a cross-sectional view of the cell phone showing the battery pack sealed in the battery pack housing with the battery lid.

With the battery lid 11 held on the battery lid holder 43 and the battery pack 12 sealed inside the battery pack housing 33 as shown in FIG. 10A, the battery lid 11 is detached from the battery lid holder 43 while manipulating the operation lever 41 to the free side to disengage the outward engagement claws 21a and the inward engagement claws 21b of the battery lid 11 from the engagement portions 23a and the engagement holes 23b of the battery lid holder 43.

Figure 10B:
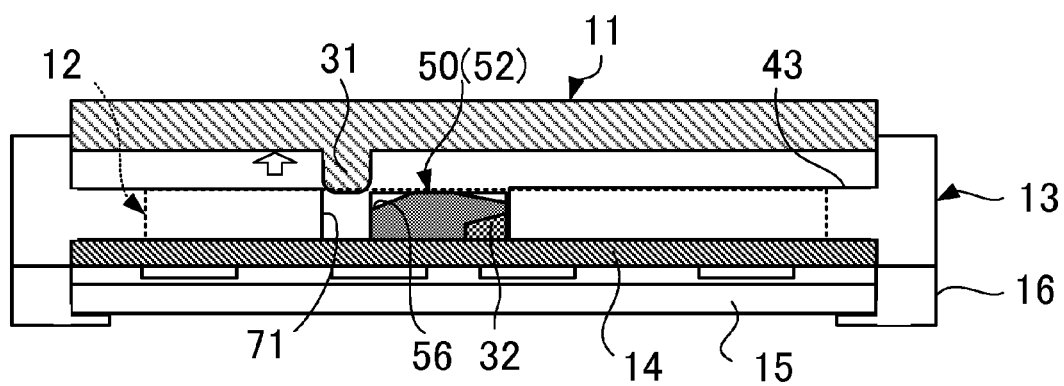
FIG. 10B is a cross-sectional view showing a state where the battery lid is being detached from the battery lid holder.
Figure 10B:
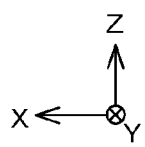

Through this operation, as the battery lid 11 is separated from the battery lid holder 43, as shown in FIG. 10B, the depression protrusion 31 of the battery lid 11 is separated from the space formed between the left side face 57 of the lock portion 52 of the battery lock member 50 and the left side face 71 of the recessed space 70.

Figure 10C:
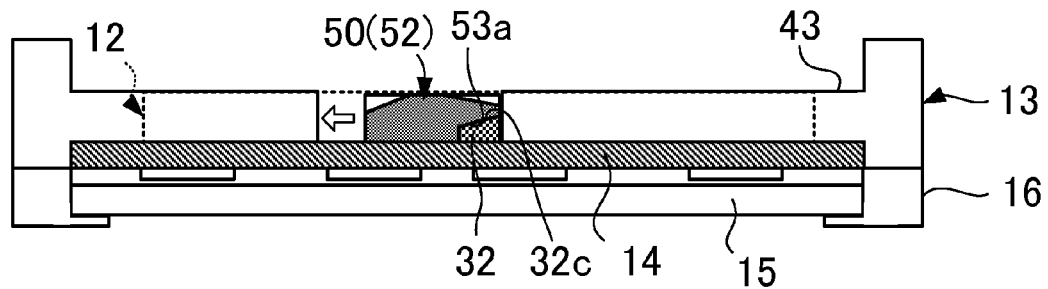
FIG. 10C is a cross-sectional view showing a state where the battery pack is being removed from the battery pack housing in the locked state of the battery lock member.
Figure 10C:
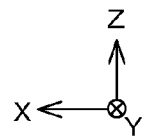

As a result, as shown in FIG. 10C, the battery lock member 50 is released from the restriction by the depression protrusion 31 of the battery lid 11, so that the battery lock member 50 is freely slidable along the guide rail 13b (see FIG. 5). In this state, the third inclined surface 53a of the engagement recess 53 of the lock portion 52 and the back face 32c of the engagement protrusion 32 of the battery pack 12 faces each other in parallel.

When the battery pack 12 is pulled upward and removed with the battery lock member 50 in the locked state shown in FIG. 10C, the back face 32c of the engagement protrusion 32 of the battery pack 12 slides in contact with the third inclined surface 53a of the engagement recess 53 of the lock portion 52. Then, the upward movement of the battery pack 12 causes the battery lock member 50 to move toward the +X side (left side). At this time, the battery lock member 50 slides on the surface of the bottom cover of the board 14 via the pair of slide assisting ribs 51d. This releases the locking of the battery pack 12 in the battery pack housing 33 by the battery lock member 50.

Figure 10D:
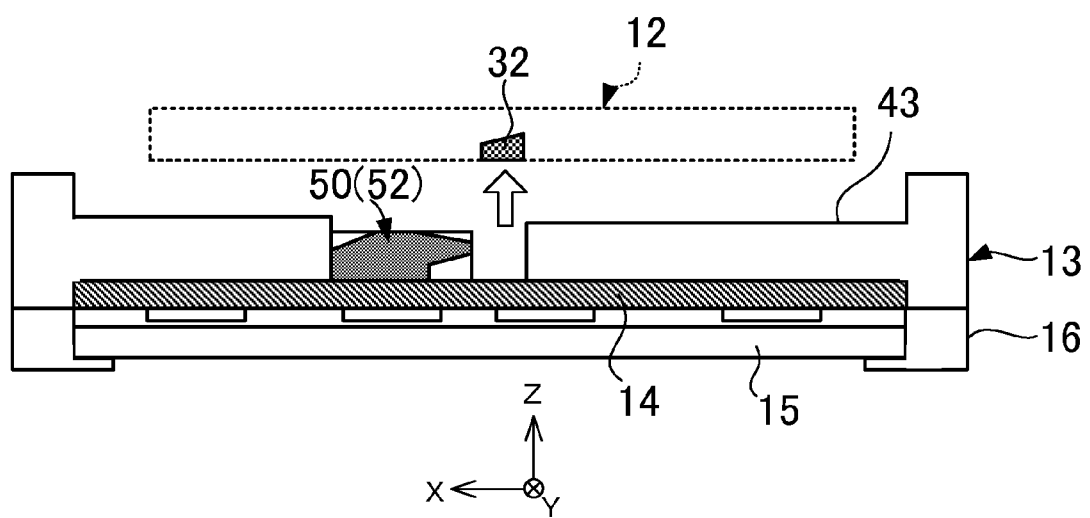
FIG. 10D is a cross-sectional view showing a state after the battery pack is removed from the battery pack housing.

Then, the engagement recess 53 of the lock portion 52 is not present on the engagement protrusion 32 of the battery pack 12 as shown in FIG. 10D, so that the battery pack 12 can be removed from the battery pack housing 33.

According to the embodiment, as described above, the operation of housing the battery pack 12 into the battery pack housing 33 causes the bottom face 32b of the engagement protrusion 32 of the battery pack 12 to slide in contact with the first inclined surface 54 of the lock portion 52 of the battery lock member 50 located in the position of locking the battery pack 12. Then, the downward movement of the engagement protrusion 32 presses the battery lock member 50 leftward, so that the battery lock member 50 slides in the direction of unlocking the battery pack 12. Then, the locking of the battery pack 12 is released. Even with the battery lock member 50 being located in the position of locking the battery pack 12, merely housing the battery pack 12 into the battery pack housing 33 causes the battery lock member 50 to automatically slide in the direction of releasing the locking to unlock the battery pack 12 as described above, so that the battery pack 12 is easily housed in the battery pack housing 33.

According to the embodiment, the operation of attaching the battery lid 11 to the battery lid holder 43 causes the depression protrusion 31 of the battery lid 11 to slide in contact with the second inclined surface 56 of the lock portion 52 of the battery lock member 50 located in the position of unlocking the battery pack 12. Then, the downward movement of the depression protrusion 31 presses the battery lock member 50 rightward, so that the battery lock member 50 slides in the direction of locking the battery pack 12. Then, the battery pack 12 is locked. Even with the battery lock member 50 being located in the position of unlocking the battery pack 12, merely attaching the battery lid 11 to the battery lid holder 43 causes the battery lock member 50 to automatically slide in the direction of locking the battery pack 12 to lock the battery pack 12 as described above, so that the battery pack 12 is easily locked in the battery pack housing 33.

According to the embodiment, when the battery pack 12 housed in the battery pack housing 33 is pulled upward with the battery lock member 50 being in the locked state, the back face 32c of the engagement protrusion 32 of the battery pack 12 slides in contact with the third inclined surface 53a of the engagement recess 53 of the lock portion 52. Then, the battery lock member 50 moves toward the +X side (left side). This automatically releases the locking of the battery pack 12 in the battery pack housing 33 with the battery lock member 50. As a result, removable of the battery pack 12 from the cell phone 10 is carried out easily.

According to the embodiment, with the battery lid 11 attached to the battery lid holder 43 and the battery pack 12 sealed inside the battery pack housing 33, the depression protrusion 31 of the battery lid 11 abuts on the left side face 57 of the lock portion 52 of the battery lock member 50. This stabilizes the locked state of the battery pack 12 with the battery lock member 50. As a result, electrical connection of the connection terminal 22 provided on the battery pack 12 to the connection terminal (not shown) provided on the cell-phone lower case 13 is maintained in a stable state.

According to the embodiment, even when the battery pack 12 is forcibly housed into the battery pack housing 33 with the battery lock member 50 being located in the position of locking the battery pack 12, the battery lock member 50 is automatically set in the unlocked state, thus preventing the battery pack 12 and the cell phone body from being damaged. In addition, even when the battery pack 12 is forcibly removed from inside the battery pack housing 33 with the battery lock member 50 being located in the position of locking the battery pack 12, the battery lock member 50 is automatically set in the unlocked state, thus preventing the battery pack 12 and the cell phone body from being damaged.

The invention is not limited to the foregoing embodiment, may be modified in various ways without departing from the subject matter of the invention.

For example, the invention is not limited to a cell phone illustrated in the foregoing description of the embodiment, and may be adapted to portable communication terminals such as a PDA (Personal Digital Assistant), a PHS (Personal Handy-phone System), a mobile PC (Personal Computer) and a tablet terminal, and other electronic apparatuses.

According to the embodiment, the battery lock member 50 is provided only on one side of the battery pack 12 in the lengthwise direction. That is, the recessed space 70 is provided in the −Y side (rear side) region of the battery lid holder 43, the battery lock member 50 is accommodated in the recessed space 70, and the battery lock member 50 sides in the ±X direction along the guide rail 13b formed in the recessed space 70. The battery lock member 50 is not limited to this type, and may be provided on both lengthwise sides of the battery pack 12. That is, the recessed space 70 may be formed in each of the ±Y side (front and rear) regions of the battery lid holder 43, and a single battery lock member 50 is accommodated in each recessed space 70, and may slide in ±X direction along the guide rail 13b formed in each recessed space 70. The provision of the battery lock member 50 on both lengthwise sides of the battery pack 12 this way further stabilizes the locked state of the battery pack 12 in the battery pack housing 33. As a result, electrical connection of the connection terminal 22 provided on the battery pack 12 to the connection terminal (not shown) provided on the cell-phone lower case 13 is maintained in a more stable state.

According to the embodiment, the cell phone 10 includes the touch panel 15 that serves both the LCD equipped display and the key operator. The cell phone 10 is not limited to this type, and may be configured to have the LCD equipped display and the key operator separately.

According to the embodiment, the guide portion to slide the battery lock member 50 is the rail-like guide rail 13b, and the guided portion is the recessed guided groove 51a that is slidably fitted on the guide rail 13b. They are not limited to those types; the guide portion for sliding the battery lock member 50 may be a recessed guide groove, and the guided portion may be a rail-like guided rail that is slidably fitted into the guide groove.

According to the embodiment, the first portion of the battery pack 12 is the engagement protrusion 32 with a trapezoidal cross section, which is formed to protrude from the center portion of the +Y-side (front side) side face of the battery pack 12, and is used for locking the battery pack 12. This is not restrictive, and the first portion of the battery pack 12 may be formed to protrude from another portion such as the bottom face of the battery pack 12, or may not be used to lock the battery pack 12, as long as the effects of the invention are demonstrated. Further, the first portion of the battery pack 12 may have a shape other than the trapezoidal cross-sectional shape.

According to the embodiment, the second portion of the battery lid 11 is the depression protrusion 31 with a quadratic prism shape formed to protrude from the bottom face of the battery lid 11. The second portion of the battery lid 11 is not limited to this type, and may be formed to protrude from another portion such as a side portion of the battery lid 11, or may have a shape other than the quadratic prism shape, as long as the effects of the invention are demonstrated.

According to the embodiment, the cell phone 10 and its components have rectangular shapes, which are not restrictive, and may be elliptical shapes or may have structures with curved surfaces from the viewpoint of design.

Although the water-proof structure of the cell phone 10 has not been mentioned in the description of the embodiment, it is needless to say that the joint portion of the battery lid 11 and the battery lid holder 43 may be made liquid tight by a rubber packing.

Moreover, the invention may be worked out in various embodiments and modifications without departing from the spirit and scope of the invention in the broad sense. The foregoing embodiment is intended only for describing the invention, and shall not limit the scope of the invention.

Some or all of the embodiments and modifications are described in the following notes, which are not restrictive.

(Note 1)

A battery pack lock structure comprising:

a battery pack housing provided on an electronic apparatus body for housing a battery pack;

a battery lid detachably attached to the electronic apparatus body to close an opening of the battery pack housing; and a battery lock member for locking the battery pack, the battery lock member having a first inclined surface that permits sliding of the battery lock member in such a way that an operation of housing the battery pack causes a first portion of the battery pack to slide in contact with the first inclined surface, thereby releasing the locking, and a second inclined surface that permits sliding of the battery lock member in such a way that an operation of attaching the battery lid causes a second portion of the battery lid to slide in contact with the second inclined surface, thereby achieving the locking.

(Note 2)

The battery pack lock structure according to Note 1, wherein the battery lock member further has a third inclined surface that permits sliding of the battery lock member in such a way that an operation of detaching the battery pack causes the first portion of the battery pack to slide in contact with the third inclined surface, thereby releasing the locking.

(Note 3)

The battery pack lock structure according to Note 1 or 2, wherein the battery lock member locks the battery pack with the first portion of the battery pack.

(Note 4)

The battery pack lock structure according to any one of Notes 1 to 3, wherein as the second portion of the battery lid abuts on the battery lock member with the battery lid covering the opening of the battery pack housing, a locked state of the battery pack is maintained.

(Note 5)

The battery pack lock structure according to any one of Notes 1 to 4, wherein a guide portion that permits slide movement of the battery lock member is provided in the electronic apparatus body.

(Note 6)

The battery pack lock structure according to Note 5, wherein the battery lock member is engaged with the guide portion in a non-disengageable manner.

(Note 7)

The battery pack lock structure according to Note 5 or 6, wherein a battery lid holder for holding the battery lid is provided at a peripheral region of the opening of the battery pack housing, and the guide portion is provided in a recessed space formed in the battery lid holder.

(Note 8)

The battery pack lock structure according to Note 5, wherein the battery lock member is provided with a guided portion that is slidably fitted on the guide portion.

(Note 9)

The battery pack lock structure according to Note 8, wherein the guide portion is a rail-like guide rail, and the guided portion is a recessed guided groove that is slidably fitted on the guide rail.

(Note 10)

An electronic apparatus having the battery pack lock structure according to any one of Notes 1 to 9.

The invention may be worked out in various embodiments and modifications without departing from the spirit and scope of the invention in the broad sense. The above-described embodiment is intended only for describing the invention, and shall not limit the scope of the invention.

This application is based on Japanese Patent Application 2010-243525, filed Oct. 29, 2010, the specification, Claims and the drawings of which are incorporated in their entirety by reference herein.

DESCRIPTION OF REFERENCE NUMERALS

10 Cell phone
11 battery lid
12 battery pack
13 cell-phone lower case
13a Part of cell-phone lower case
13b Guide rail
13c Projection of guide rail
14 Board
15 Touch panel
16 Cell-phone upper case
16a Bolt
21a Outward engagement claw of battery lid
21b Inward engagement claw of battery lid
22 Connection terminal
23 Engagement hole of cell-phone lower case
31 Depression protrusion (of battery lid) (second portion of battery lid)
32 Engagement protrusion of battery pack (first portion of battery pack)
32a Front face of engagement protrusion
32b Bottom face of engagement protrusion
32c Back face of engagement protrusion
33 Battery pack housing
33a Opening of battery pack housing
41 Operation lever of lock mechanism
43 Battery lid holder
50 Battery lock member
51 Slide of battery lock member
51a Guided groove of slide
51b Projection of slide
51c Pressing protrusion of slide
52 Lock portion of battery lock member
53 Engagement recess of lock portion
54 First inclined surface of lock portion
55 Upper surface of lock portion
56 Second inclined surface of lock portion
57 Left side face of lock portion
70 Recessed space
71 Left side face of recessed space

The invention claimed is:

1. A battery pack lock structure comprising:
a battery pack;
a battery pack housing provided on an electronic apparatus body for housing the battery pack;
a battery lid detachably attached to the electronic apparatus body to close an opening of the battery pack housing; and
a battery lock member for locking the battery pack, wherein
the battery lock member comprises:
   a slider for sliding the battery lock member; and
   a lock portion integrally formed with the slider and protruding from a front side of the slider,
a top face of the lock portion comprises a first inclined surface downwardly inclined, and a second inclined surface downwardly inclined,
the first inclined surface and the second inclined surface of the battery lock member are opposed to each other to form a first angular portion therebetween along a moving direction of the battery lock member,
the battery pack comprises an engagement protrusion that protrudes from the battery pack,
the battery lid comprises a depression protrusion that protrudes downward from the battery lid,
in response to inserting the battery pack in the battery pack housing, the slider causes the battery lock member to slide to release the locking by the engagement protrusion of the battery pack sliding in contact with the first inclined surface, and
in response to an attachment of the battery lid, the slider causes the battery lock member to slide to achieve the locking by the depression protrusion of the battery lid sliding in contact with the second inclined surface.

2. The battery pack lock structure according to claim 1, wherein
the lock portion further comprises an engagement recess,
a top face of the engagement recess serves as a third inclined surface that faces, in parallel, a back face of the engagement protrusion when the engagement recess engages with the engagement protrusion of the battery pack,
the first inclined surface and the third inclined surface of the battery lock member are opposed to each other to form a second angular portion therebetween along the moving direction of the battery lock member, and
in response to a removal of the battery pack, the slider causes the battery lock member to slide to release the locking by the engagement protrusion of the battery pack sliding in contact with the third inclined surface.

3. The battery pack lock structure according to claim 2, wherein in response to the engagement recess of the lock portion engaging with the engagement protrusion of the battery pack, the battery lock member causes the battery pack to be locked within the battery pack housing.

4. The battery pack lock structure according to claim 1, wherein
the lock portion comprises a side surface continual with the second inclined surface,
the depression protrusion of the battery lid is disposed in a position where the depression protrusion abuts on one of the second inclined surface and the side surface of the lock portion while the battery lid is covering the opening of the battery pack housing, and
as the depression protrusion the battery lid abuts on one of the second inclined surface and the side surface of the lock portion while the battery lid is covering the opening of the battery pack housing, a locked state of the battery pack is maintained.

5. The battery pack lock structure according to claim 1, wherein a guide portion that permits slide movement of the battery lock member is provided in the electronic apparatus body.

6. The battery pack lock structure according to claim 5, wherein the battery lock member is engaged with the guide portion in a non-disengageable manner.

7. The battery pack lock structure according to claim 5, wherein a battery lid holder for holding the battery lid is provided at a peripheral region of the opening of the battery pack housing, and
the guide portion is provided in a recessed space formed in the battery lid holder.

8. The battery pack lock structure according to claim 5, wherein the slider of the battery lock member has a guided portion that is slidably fitted on the guide portion.

9. The battery pack lock structure according to claim 8, wherein the guide portion is a rail-like guide rail, and the guided portion is a recessed guided groove that is slidably fitted on the guide rail.

10. An electronic apparatus comprising having the battery pack lock structure according to claim 1.

11. The battery pack lock structure according to claim 3, wherein
the lock portion comprises a side surface continual with the second inclined surface,
the depression protrusion of the battery lid is disposed in a position where the depression protrusion abuts on one of the second inclined surface and the side surface of the lock portion while the battery lid is covering the opening of the battery pack housing, and
as the depression protrusion of the battery lid abuts on one of the second inclined surface and the side surface of the lock portion while the battery lid is covering the opening of the battery pack housing, a locked state of the battery pack is maintained.

12. The battery pack lock structure according to claim 3, wherein a guide portion that permits slide movement of the battery lock member is provided in the electronic apparatus body.

13. The battery pack lock structure according to claim 12, wherein the battery lock member is engaged with the guide portion in a non-disengageable manner.

14. The battery pack lock structure according to claim 12, wherein a battery lid holder for holding the battery lid is provided at a peripheral region of the opening of the battery pack housing, and
the guide portion is provided in a recessed space formed in the battery lid holder.

15. The battery pack lock structure according to claim 12, wherein the slider of the battery lock member has a guided portion that is slidably fitted on the guide portion.

16. The battery pack lock structure according to claim 15, wherein the guide portion is a rail-like guide rail, and the guided portion is a recessed guided groove that is slidably fitted on the guide rail.

17. An electronic apparatus comprising the battery pack lock structure according to claim 3.

* * * * *